United States Patent
Cook et al.

(10) Patent No.: US 8,482,157 B2
(45) Date of Patent: Jul. 9, 2013

(54) INCREASING THE Q FACTOR OF A RESONATOR

(75) Inventors: Nigel Cook, El Cajon, CA (US); Lukas Sieber, Olten (CH); Hanspeter Widmer, Wohlenschwil (CH)

(73) Assignee: QUALCOMM Incorporated, San Diego, CA (US)

( * ) Notice: Subject to any disclaimer, the term of this patent is extended or adjusted under 35 U.S.C. 154(b) by 166 days.

(21) Appl. No.: 12/189,433

(22) Filed: Aug. 11, 2008

(65) Prior Publication Data

US 2009/0051224 A1 Feb. 26, 2009
US 2012/0001492 A9 Jan. 5, 2012

Related U.S. Application Data

(63) Continuation-in-part of application No. 12/018,069, filed on Jan. 22, 2008.

(60) Provisional application No. 60/954,941, filed on Aug. 9, 2007, provisional application No. 60/904,628, filed on Mar. 2, 2007.

(51) Int. Cl.
*H01F 27/42* (2006.01)
(52) U.S. Cl.
USPC .......................................................... 307/104
(58) Field of Classification Search
USPC .......................................................... 307/104
See application file for complete search history.

(56) References Cited

U.S. PATENT DOCUMENTS

| | | | |
|---|---|---|---|
| 3,098,971 A | 7/1963 | Richardson | |
| 3,480,229 A | 11/1969 | Entremont | |
| 3,588,905 A | 6/1971 | Dunlavy, Jr. | |
| 3,675,108 A | 7/1972 | Nicholl | |
| 3,918,062 A | 11/1975 | Haruki et al. | |
| 3,938,018 A | 2/1976 | Dahl | |
| 3,999,185 A * | 12/1976 | Polgar et al. | 343/709 |
| 4,088,999 A | 5/1978 | Fletcher et al. | |
| 4,388,524 A | 6/1983 | Walton | |
| 4,390,924 A * | 6/1983 | Nebiker, Jr. | 361/279 |
| 4,473,825 A | 9/1984 | Walton | |
| 4,524,411 A | 6/1985 | Willis | |
| 4,760,394 A | 7/1988 | Takeuchi et al. | |
| 4,914,539 A | 4/1990 | Turner et al. | |
| 4,959,568 A | 9/1990 | Stokes | |
| 4,959,764 A | 9/1990 | Bassett | |
| 5,027,709 A * | 7/1991 | Slagle | 102/427 |

(Continued)

FOREIGN PATENT DOCUMENTS

| | | |
|---|---|---|
| CN | 1202025 A | 12/1998 |
| CN | 1231069 A | 10/1999 |

(Continued)

OTHER PUBLICATIONS

"Wireless Non-Radiative Energy Transfer", MIT paper, publication and date unknown, believed to be 2007.

(Continued)

*Primary Examiner* — Robert L. DeBeradinis
(74) *Attorney, Agent, or Firm* — Knobbe, Martens, Olson & Bear, LLP

(57) ABSTRACT

A wireless powering and charging system is described. The antennas can be high q loop antennas. The antennas can use coupling between a first part and a second part.

93 Claims, 6 Drawing Sheets

U.S. PATENT DOCUMENTS

| | | | |
|---|---|---|---|
| 5,072,233 A * | 12/1991 | Zanzig | 343/744 |
| 5,153,583 A | 10/1992 | Murdoch | |
| 5,175,561 A | 12/1992 | Goto | |
| 5,387,818 A | 2/1995 | Leibowitz | |
| 5,396,538 A | 3/1995 | Hong | |
| 5,397,962 A | 3/1995 | Moslehi | |
| 5,438,699 A | 8/1995 | Coveley | |
| 5,450,305 A | 9/1995 | Boys et al. | |
| 5,455,466 A | 10/1995 | Parks et al. | |
| 5,491,715 A | 2/1996 | Flaxl | |
| 5,519,262 A | 5/1996 | Wood | |
| 5,596,567 A | 1/1997 | Demuro et al. | |
| 5,608,417 A | 3/1997 | De Vall | |
| 5,621,322 A | 4/1997 | Ehnholm | |
| 5,654,621 A | 8/1997 | Seelig | |
| 5,684,828 A | 11/1997 | Bolan et al. | |
| 5,734,255 A | 3/1998 | Thompson et al. | |
| 5,767,601 A | 6/1998 | Uchiyama | |
| 5,796,240 A | 8/1998 | Saito et al. | |
| 5,821,638 A | 10/1998 | Boys et al. | |
| 5,856,710 A | 1/1999 | Baughman et al. | |
| 5,936,575 A | 8/1999 | Azzarelli et al. | |
| 5,963,012 A | 10/1999 | Garcia et al. | |
| 5,966,941 A | 10/1999 | Ghoshal | |
| 5,975,714 A | 11/1999 | Vetorino et al. | |
| 5,982,139 A | 11/1999 | Parise | |
| 6,016,046 A | 1/2000 | Kaite et al. | |
| 6,028,413 A | 2/2000 | Brockmann | |
| 6,031,708 A | 2/2000 | Guermeur | |
| 6,040,680 A | 3/2000 | Toya et al. | |
| 6,040,986 A | 3/2000 | Sakamoto et al. | |
| 6,104,354 A * | 8/2000 | Hill et al. | 343/744 |
| 6,114,834 A | 9/2000 | Parise | |
| 6,127,799 A | 10/2000 | Krishnan | |
| 6,175,124 B1 | 1/2001 | Cole et al. | |
| 6,184,651 B1 | 2/2001 | Fernandez et al. | |
| 6,265,789 B1 | 7/2001 | Honda et al. | |
| 6,275,681 B1 | 8/2001 | Vega et al. | |
| 6,291,901 B1 | 9/2001 | Cefo | |
| 6,317,338 B1 * | 11/2001 | Boys | 363/25 |
| 6,337,628 B2 | 1/2002 | Campana, Jr. | |
| 6,341,076 B1 | 1/2002 | Kadatskyy et al. | |
| 6,411,824 B1 | 6/2002 | Eidson | |
| 6,437,685 B2 | 8/2002 | Hanaki | |
| 6,507,152 B2 | 1/2003 | Matsumoto et al. | |
| 6,523,493 B1 | 2/2003 | Brcka | |
| 6,556,054 B1 | 4/2003 | Goodman et al. | |
| 6,633,026 B2 | 10/2003 | Tuominen | |
| 6,636,146 B1 | 10/2003 | Wehoski | |
| 6,670,864 B2 | 12/2003 | Hyvonen et al. | |
| 6,798,716 B1 | 9/2004 | Charych | |
| 6,803,744 B1 | 10/2004 | Sabo | |
| 6,879,076 B2 | 4/2005 | Long | |
| 6,891,287 B2 | 5/2005 | Moret | |
| 6,912,137 B2 | 6/2005 | Berghegger | |
| 6,960,968 B2 | 11/2005 | Odendaal et al. | |
| 6,965,352 B2 | 11/2005 | Ohara et al. | |
| 6,967,462 B1 | 11/2005 | Landis | |
| 6,972,542 B2 | 12/2005 | Patino et al. | |
| 6,972,543 B1 | 12/2005 | Wells | |
| 7,012,405 B2 | 3/2006 | Nishida et al. | |
| 7,068,991 B2 | 6/2006 | Parise | |
| 7,076,206 B2 | 7/2006 | Elferich et al. | |
| 7,095,301 B2 | 8/2006 | Hidaka et al. | |
| 7,110,462 B2 | 9/2006 | Monsen | |
| 7,116,018 B2 | 10/2006 | Strobl | |
| 7,154,451 B1 | 12/2006 | Sievenpiper | |
| 7,164,344 B2 | 1/2007 | Deguchi et al. | |
| 7,167,139 B2 | 1/2007 | Kim et al. | |
| 7,180,265 B2 | 2/2007 | Naskali et al. | |
| 7,180,291 B2 | 2/2007 | Chmielewski et al. | |
| 7,209,792 B1 | 4/2007 | Parramon et al. | |
| 7,212,414 B2 | 5/2007 | Baarman | |
| 7,215,061 B2 | 5/2007 | Kihara et al. | |
| 7,248,165 B2 | 7/2007 | Collins et al. | |
| 7,256,532 B2 | 8/2007 | Viehland et al. | |
| 7,262,701 B1 | 8/2007 | Nguyen | |
| 7,380,150 B2 | 5/2008 | Meier et al. | |
| 7,423,518 B2 | 9/2008 | Yamada | |
| 7,511,500 B2 | 3/2009 | Schiano et al. | |
| 7,525,283 B2 | 4/2009 | Cheng et al. | |
| 7,554,316 B2 | 6/2009 | Stevens et al. | |
| 7,598,646 B2 | 10/2009 | Cleveland | |
| 7,675,197 B2 | 3/2010 | Tetlow | |
| 7,676,263 B2 | 3/2010 | Harris et al. | |
| 7,684,868 B2 | 3/2010 | Tai et al. | |
| 7,688,036 B2 | 3/2010 | Yarger et al. | |
| 7,755,552 B2 | 7/2010 | Schantz et al. | |
| 7,760,151 B2 | 7/2010 | Poilasne et al. | |
| 7,777,396 B2 | 8/2010 | Rastegar et al. | |
| 7,825,543 B2 | 11/2010 | Karalis et al. | |
| 7,839,124 B2 | 11/2010 | Yamazaki et al. | |
| 7,844,306 B2 | 11/2010 | Shearer et al. | |
| 7,868,482 B2 | 1/2011 | Greene et al. | |
| 7,885,050 B2 * | 2/2011 | Lee | 361/113 |
| 8,055,310 B2 | 11/2011 | Beart et al. | |
| 8,159,412 B2 | 4/2012 | Yun et al. | |
| 8,169,185 B2 | 5/2012 | Partovi et al. | |
| 2001/0012208 A1 | 8/2001 | Boys | |
| 2001/0026244 A1 | 10/2001 | Ieda et al. | |
| 2001/0029167 A1 | 10/2001 | Takeda et al. | |
| 2002/0017979 A1 | 2/2002 | Krause et al. | |
| 2002/0036977 A1 | 3/2002 | Lenssen et al. | |
| 2002/0057161 A1 | 5/2002 | Katsura et al. | |
| 2002/0057584 A1 | 5/2002 | Brockmann | |
| 2002/0160722 A1 | 10/2002 | Terranova et al. | |
| 2002/0190908 A1 | 12/2002 | Andrews et al. | |
| 2003/0090353 A1 | 5/2003 | Robinson et al. | |
| 2003/0162566 A1 | 8/2003 | Shapira et al. | |
| 2003/0174099 A1 | 9/2003 | Bauer et al. | |
| 2003/0193438 A1 | 10/2003 | Yoon | |
| 2003/0199778 A1 | 10/2003 | Mickle et al. | |
| 2003/0203733 A1 | 10/2003 | Sharon | |
| 2003/0214961 A1 | 11/2003 | Nevo et al. | |
| 2004/0001029 A1 | 1/2004 | Parsche et al. | |
| 2004/0130425 A1 | 7/2004 | Dayan et al. | |
| 2004/0150521 A1 | 8/2004 | Stilp | |
| 2004/0160323 A1 | 8/2004 | Stilp | |
| 2004/0204781 A1 | 10/2004 | Hsien | |
| 2004/0212500 A1 | 10/2004 | Stilp | |
| 2004/0227002 A1 | 11/2004 | Watanabe | |
| 2004/0227057 A1 | 11/2004 | Tuominen et al. | |
| 2004/0227619 A1 | 11/2004 | Watanabe | |
| 2005/0007239 A1 | 1/2005 | Woodard et al. | |
| 2005/0017677 A1 | 1/2005 | Burton et al. | |
| 2005/0029351 A1 | 2/2005 | Yoshinaga et al. | |
| 2005/0043055 A1 | 2/2005 | Vance | |
| 2005/0057422 A1 | 3/2005 | Deguchi et al. | |
| 2005/0075697 A1 | 4/2005 | Olson et al. | |
| 2005/0104457 A1 | 5/2005 | Jordan et al. | |
| 2005/0125093 A1 | 6/2005 | Kikuchi et al. | |
| 2005/0127867 A1 | 6/2005 | Calhoon et al. | 320/108 |
| 2005/0131495 A1 | 6/2005 | Parramon et al. | 607/61 |
| 2005/0194926 A1 | 9/2005 | Di Stefano | |
| 2005/0273143 A1 | 12/2005 | Kanzius et al. | |
| 2006/0017438 A1 | 1/2006 | Mullen et al. | |
| 2006/0061325 A1 | 3/2006 | Tang et al. | |
| 2006/0071790 A1 | 4/2006 | Duron et al. | |
| 2006/0094449 A1 | 5/2006 | Goldberg | |
| 2006/0103355 A1 | 5/2006 | Patino et al. | |
| 2006/0113955 A1 | 6/2006 | Nunally | |
| 2006/0125703 A1 | 6/2006 | Ma et al. | |
| 2006/0145659 A1 | 7/2006 | Patino et al. | |
| 2006/0145660 A1 | 7/2006 | Black et al. | |
| 2006/0159536 A1 | 7/2006 | Pu | |
| 2006/0160517 A1 | 7/2006 | Yoon | |
| 2006/0164312 A1 | 7/2006 | Mathieu | |
| 2006/0208903 A1 | 9/2006 | Loh et al. | |
| 2006/0239043 A1 | 10/2006 | Ohbo | |
| 2006/0273756 A1 | 12/2006 | Bowling et al. | |
| 2007/0010295 A1 | 1/2007 | Greene et al. | |
| 2007/0029965 A1 | 2/2007 | Hui et al. | |
| 2007/0046433 A1 | 3/2007 | Mukherjee | |
| 2007/0054705 A1 | 3/2007 | Liow et al. | |
| 2007/0060221 A1 | 3/2007 | Burgan et al. | |
| 2007/0082611 A1 | 4/2007 | Terranova et al. | |
| 2007/0091006 A1 | 4/2007 | Thober et al. | |

| | | | | | |
|---|---|---|---|---|---|
| 2007/0096910 A1 | 5/2007 | Waters | | FOREIGN PATENT DOCUMENTS | |
| 2007/0103110 A1 | 5/2007 | Sagoo et al. | | | |
| 2007/0103291 A1 | 5/2007 | Adams | CN | 2582188 Y | 10/2003 |
| 2007/0105524 A1 | 5/2007 | Fullam et al. | DE | 4023412 | 2/1992 |
| 2007/0114945 A1 | 5/2007 | Mattaboni et al. | DE | 19509918 | 9/1996 |
| 2007/0120678 A1 | 5/2007 | Posamentier | DE | 19729722 | 1/1999 |
| 2007/0126395 A1 | 6/2007 | Suchar | DE | 19938460 | 2/2001 |
| 2007/0126650 A1 | 6/2007 | Guenther | DE | 102004009896 | 9/2005 |
| 2007/0135078 A1 | 6/2007 | Ljung | DE | 102005053111 | 5/2007 |
| 2007/0139000 A1 | 6/2007 | Kozuma et al. | EP | 0568920 | 11/1993 |
| 2007/0145830 A1 | 6/2007 | Lee et al. | EP | 298707 | 9/1994 |
| 2007/0146218 A1 | 6/2007 | Turner et al. | EP | 724308 | 7/1996 |
| 2007/0156204 A1 | 7/2007 | Denker et al. | EP | 773509 | 4/2002 |
| 2007/0164414 A1 | 7/2007 | Dokai et al. | EP | 1233547 A1 | 8/2002 |
| 2007/0171681 A1 | 7/2007 | Baarman | EP | 1302822 | 4/2003 |
| 2007/0178945 A1 | 8/2007 | Cook et al. | EP | 1315051 | 5/2003 |
| 2007/0188326 A1 | 8/2007 | Pluss et al. | EP | 1003266 | 4/2006 |
| 2007/0205881 A1 | 9/2007 | Breed | EP | 1413975 | 5/2007 |
| 2007/0214940 A1 | 9/2007 | Stoneback | EP | 1892799 | 2/2008 |
| 2007/0222542 A1 | 9/2007 | Joannopoulous | GB | 1280516 | 7/1972 |
| 2007/0281625 A1 | 12/2007 | Boys | GB | 1343071 | 1/1974 |
| 2007/0296393 A1 | 12/2007 | Malpas et al. | GB | 2070298 | 9/1981 |
| 2007/0296548 A1 | 12/2007 | Hall et al. | GB | 2318696 | 4/1998 |
| 2007/0298846 A1 | 12/2007 | Greene et al. | JP | 57032144 | 2/1982 |
| 2008/0003963 A1 | 1/2008 | Turner | JP | 62071430 A | 4/1987 |
| 2008/0014897 A1 | 1/2008 | Cook et al. | JP | 1298901 A | 12/1989 |
| 2008/0054638 A1 | 3/2008 | Greene et al. | JP | 4115606 A | 4/1992 |
| 2008/0067874 A1 | 3/2008 | Tseng | JP | 04271201 | 9/1992 |
| 2008/0093934 A1 | 4/2008 | Kato | JP | 5038232 A | 2/1993 |
| 2008/0108862 A1 | 5/2008 | Jordan et al. | JP | 05183318 | 7/1993 |
| 2008/0122294 A1 | 5/2008 | Simon et al. | JP | 6044207 A | 2/1994 |
| 2008/0122297 A1 | 5/2008 | Arai | JP | 06133476 | 5/1994 |
| 2008/0129147 A1 | 6/2008 | Thiesen et al. | JP | 6044207 U | 6/1994 |
| 2008/0167755 A1 | 7/2008 | Curt | JP | 6303726 | 10/1994 |
| 2008/0186129 A1 | 8/2008 | Fitzgibbon | JP | 6327172 A | 11/1994 |
| 2008/0191897 A1 | 8/2008 | McCollough ............ 340/625.22 | JP | 6339232 | 12/1994 |
| 2008/0211320 A1 | 9/2008 | Cook et al. | JP | 8033244 A | 2/1996 |
| 2008/0211455 A1 | 9/2008 | Park et al. | JP | 8079976 | 3/1996 |
| 2008/0225564 A1 | 9/2008 | Bohm et al. | JP | 8088942 | 4/1996 |
| 2008/0278264 A1* | 11/2008 | Karalis et al. ................. 333/219 | JP | 8130840 A | 5/1996 |
| 2008/0293446 A1 | 11/2008 | Rofougaran et al. | JP | 8162689 A | 6/1996 |
| 2008/0296978 A1 | 12/2008 | Finkenzeller et al. | JP | 9037475 | 2/1997 |
| 2008/0309452 A1 | 12/2008 | Zeine | JP | 9182322 | 7/1997 |
| 2009/0002175 A1 | 1/2009 | Waters | JP | 10097931 | 4/1998 |
| 2009/0009177 A1 | 1/2009 | Kim et al. | JP | 10225020 | 8/1998 |
| 2009/0026907 A1 | 1/2009 | Davidowitz et al. | JP | 11143600 | 5/1999 |
| 2009/0045772 A1* | 2/2009 | Cook et al. .................... 320/108 | JP | 11188113 A | 7/1999 |
| 2009/0052721 A1 | 2/2009 | Dabrowski | JP | 11191146 | 7/1999 |
| 2009/0058361 A1 | 3/2009 | John | JP | 11215802 A | 8/1999 |
| 2009/0072627 A1 | 3/2009 | Cook et al. | JP | 11332135 | 11/1999 |
| 2009/0079268 A1 | 3/2009 | Cook et al. | JP | 2000078763 | 3/2000 |
| 2009/0102296 A1 | 4/2009 | Greene et al. | JP | 2000175379 | 6/2000 |
| 2009/0102419 A1 | 4/2009 | Gwon et al. | JP | 2000217279 | 8/2000 |
| 2009/0109102 A1 | 4/2009 | Dokai et al. | JP | 2001024548 A | 1/2001 |
| 2009/0111531 A1 | 4/2009 | Cui et al. | JP | 2001197672 | 7/2001 |
| 2009/0121713 A1 | 5/2009 | Van Helvoort | JP | 2001238372 A | 8/2001 |
| 2009/0146892 A1 | 6/2009 | Shimizu et al. | JP | 2001264432 A | 9/2001 |
| 2009/0167449 A1 | 7/2009 | Cook et al. | JP | 2001526374 A | 12/2001 |
| 2009/0204170 A1 | 8/2009 | Hastings et al. | JP | 2002017058 A | 1/2002 |
| 2009/0218884 A1 | 9/2009 | Soar | JP | 2002078247 A | 3/2002 |
| 2009/0243394 A1 | 10/2009 | Levine | JP | 2002508916 A | 3/2002 |
| 2009/0273242 A1 | 11/2009 | Cook | JP | 2002152191 A | 5/2002 |
| 2009/0299918 A1 | 12/2009 | Cook et al. | JP | 2002320347 | 10/2002 |
| 2009/0308933 A1 | 12/2009 | Osada | JP | 2003047177 A | 2/2003 |
| 2010/0013434 A1 | 1/2010 | Taylor-Haw et al. | JP | 2003069335 A | 3/2003 |
| 2010/0068998 A1 | 3/2010 | Zyambo et al. | JP | 2003189507 A | 7/2003 |
| 2010/0109445 A1 | 5/2010 | Kurs et al. | JP | 2004187429 A | 7/2004 |
| 2010/0134366 A1 | 6/2010 | Yu | JP | 2005039756 A | 2/2005 |
| 2010/0176936 A1* | 7/2010 | Garber et al. ............. 340/10.42 | JP | 2005045298 A | 2/2005 |
| 2010/0277387 A1 | 11/2010 | Schantz et al. | JP | 2005137040 | 5/2005 |
| 2010/0289331 A1 | 11/2010 | Shionoiri et al. | JP | 2005261187 A | 9/2005 |
| 2010/0289449 A1 | 11/2010 | Elo | JP | 2006042519 | 2/2006 |
| 2010/0315045 A1 | 12/2010 | Zeine | JP | 2006510101 A | 3/2006 |
| 2011/0031821 A1 | 2/2011 | Greene et al. | JP | 2006115592 A | 4/2006 |
| 2011/0050166 A1 | 3/2011 | Cook et al. | JP | 2006149163 A | 6/2006 |
| 2011/0069516 A1 | 3/2011 | Greene et al. | JP | 2008508842 A | 3/2008 |
| 2011/0074349 A1 | 3/2011 | Ghovanloo | JP | 2009501510 A | 1/2009 |
| | | | JP | 2010539821 A | 12/2010 |
| | | | KR | 102000017058 | 3/2000 |
| | | | KR | 1020010000674 | 1/2001 |

| | | |
|---|---|---|
| KR | 1020010030472 | 4/2001 |
| KR | 20020064451 A | 8/2002 |
| KR | 20050016879 A | 2/2005 |
| KR | 1020050019926 | 3/2005 |
| KR | 20060070795 A | 6/2006 |
| KR | 20070017804 A | 2/2007 |
| KR | 20100083846 A | 7/2010 |
| WO | WO8807732 | 10/1988 |
| WO | 9323908 A1 | 11/1993 |
| WO | WO9619028 | 6/1996 |
| WO | 9850993 A1 | 11/1998 |
| WO | WO9857413 A1 | 12/1998 |
| WO | WO9930090 A1 | 6/1999 |
| WO | WO9950780 | 10/1999 |
| WO | WO9950806 | 10/1999 |
| WO | WO0167413 | 9/2001 |
| WO | WO02060215 | 8/2002 |
| WO | WO03077364 A2 | 9/2003 |
| WO | WO2004038887 | 5/2004 |
| WO | WO2004052563 | 6/2004 |
| WO | WO2004077550 | 9/2004 |
| WO | WO2005086279 | 9/2005 |
| WO | WO2006006636 A1 | 1/2006 |
| WO | WO2006011769 A1 | 2/2006 |
| WO | WO2006031785 | 3/2006 |
| WO | WO2007008646 A2 | 1/2007 |
| WO | WO2007048052 | 5/2007 |
| WO | 2007083574 A1 | 7/2007 |
| WO | WO2007077442 | 7/2007 |

OTHER PUBLICATIONS

"Efficient wireless non-radiative mid-range energy transfer", MITpaper, publication and date unknown, believed to be 2007.

"Wireless Power Transfer via Strongly Coupled Magnetic Resonances", Kurs et al, Science Express, Jun. 7, 2007.

"Wireless Power Transfer via Strongly Coupled Magnetic Resonances", Kurs et al, scimag.org, Jul. 6, 2007.

Onizuka, et al., A design methodology of chip-to-chip wireless power transmission system, Univ. of Tokyo, International Conference on Integrated Circuit Design and Technology, 2007 (ICICDT '07), IEEE, May-Jun. 2007, pp. 1-4.

International Search Report and Written Opinion for PCT/US2008/009572, dated Mar. 13, 2009, 11 pages.

Kim, et al., Switchable polymer-based thin film coils as a power module wireless neural interfaces, Sensors and Actuators A, vol. 136, Issue 1, May 2007 (available online Nov. 27, 2006), pp. 467-474.

Myers, G.H.; Reed, G.E.; Thumin, A.; Fascher, S; and Cortes, L., "A transcutaneous power transformer," Trans. Amer. Soc. Artif. Inter. Organs, vol. 14, 1968, pp. 210-219.

Schuder, J. C. "Powering an artificial heart: Birth of the inductively coupled-radio frequency system in 1960," Artifical Organs, vol. 26, No. 11, 2002, pp. 909-915.

Schuder, J. C. Stephenson, H. E., and Townsend, J. F. (1961) "High Level electromagnetic energy transfer through a closed chest wall," Inst. Radio Engrs. Int. Conf Record, 9, 119-126.

Chunbo et al., "Research on the topology of wireless energy transfer device", Sch. of Electr. Eng. & Autom., Harbin Inst. of Technol., Harbin This paper appears in: Vehicle Power and Propulsion Conference, 2008. VPPC '08. IEEE Issue Date: Sep. 3-5, 2008 On pp. 1 Print ISBN: 978-1-4244-1848-0 Inspec Accession Number: 10394615 Digital Object Identifier: 10.1109/VPPC.2008.4677798 Date of Current Version: Nov. 18, 2008.

Dong-Gi Youn et al., "A Study on the Fundamental Transmission Experiment for Wireless Power Transmission System," 1999 IEEE Conference, Tencon 99, vol. 2, pp. 1419-1422, Sep. 1999.

Finkenzeller, "RFID Handbook: Fundamentals and Applications in Contactless Smart Cards and Identification," Second Edition, Translated by Rachel Waddington, 2003, John Wiley & Sons Ltd., pp. 106-111.

Harrist, Wireless battery charging system using radio frequency energy harvesting, Master of Science Thesis, University of Pittsburgh, 2004.

McSpadden et al., "A High Conversion Efficiency 5.8 GHz Rectenna," 1997 IEEE Microwave Symposium; vol. 2, pp. 547-550, Jun. 1997.

McSpadden et al., "Theoretical and Experimental Investigation of a Rectenna Element for Microwave Power Transmission," 1992 IEEE Transactions on Microwave Theory and Techniques, vol. 40, pp. 2359-2366, Dec. 1992.

Karalis et al., "Efficient wireless non-radiative mid-range energy transfer", Science Direct, Annals of Physics, 323(1),34-48, Apr. 17, 2007. doi:10.1016/j.aop.2007.04.27.

Kim et al., "Electrically Small Magnetic Dipole Antennas With Quality Factors Approaching the Chu Lower Bound", Antennas and Propagation, IEEE Transactions on Volume: 58 Issue: 6 Publication Date: Jun. 2010 Page(s): 1898-1906 Digital Object Identifier: 10.1109/TAP.2010.2046864.

Miranda et al., "Wireless power transfer using weakly coupled magnetostatic resonators", Energy Conversion Congress and Exposition (ECCE), 2010 IEEE Digital Object Identifier: 10.1109/ECCE.2010.5617728 Publication Year: 2010 , pp. 4179-4186 IEEE Conferences.

Shinohara et al., "Experimental Study of Large Rectenna Array for Microwave Energy Transmission," 1998 IEEE Transactions on Microwave Theory and Techniques, vol. 46, pp. 261-268, Mar. 1998.

Ozawa et al., "Wireless Energy Transmission for Micro Aerial Vehicles Using a Microwave Phased Array," 3rd International Energy Conversion Engineering Conference, Aug. 15-18, 2005, San Francisco, CA, pp. 1-6.

Tae-Whan Yoo et al., "Theoretical and Experimental Development of 10 and 35 GHz Rectennas," 1992 IEEE Transactions on Microwave Theory and Techniques, vol. 40, pp. 1259-1266, Jun. 1992.

Sekitani et al., "A Large-area Wireless Power-Transmission Sheet Using Printed Organic Transistors and Plastic MEMS Switches," Nature Materials Letter, pp. 413- 417; Jan. 2007.

Kurs et al., "Wireless Power Transfer via Strongly Coupled Magnetic Resonances", scimag.org, Jul. 6, 2007, Science, 317: 83-86.

Yates et al., "Optimal transmission frequency for ultralow-power short-range radio links", Source: IEEE Transactions on Circuits and Systems I: Fundamental Theory and Applications, v 51, n 7, 1405-13, Jul. 2004; ISSN: 1057-7122; DOI: 10.1109/TCSI.2004.830696; Publisher: IEEE, USA Author affiliation: Dept. of Electr. & Electron. Eng., Imperial Coll. London, UK.

Bayrashev, Andrey, et al., "Low frequency wireless powering of microsystems using piezoelectric-magnetostrictive laminate composites," Sensors & Actuators A:. Physical, Sep. 2004, vol. 114, Issue 2/3, pp. 244-249.

Dudek, et al., "High permeability micro-magneto-mechanical systems," International Journal of Applied Electromagnetics and Mechanics (2007), vol. 25, pp. 103-108.

Supplementary European Search Report—EP08795181—Search Authority—Munich—Jan. 24, 2012.

* cited by examiner

INCREASING THE Q FACTOR OF A RESONATOR

This application claims priority from provisional application No. 60/954,941, filed Aug. 9, 2007, the entire contents of which are herewith incorporated by reference. This application is a continuation-in-part of U.S. patent application Ser. No. 12/018,069, filed Jan. 22, 2008, which claims the benefit of U.S. Provisional App. No. 60/904,628, filed Mar. 2, 2007.

BACKGROUND

It is desirable to transfer electrical energy from a source to a destination without the use of wires to guide the electromagnetic fields. A difficulty of previous attempts has been low efficiency together with an inadequate amount of delivered power.

SUMMARY

The present application teaches a wireless electrical energy transfer, and teaches specific techniques for that energy transfer including specific antennas, and specific materials for the antennas.

BRIEF DESCRIPTION OF THE DRAWINGS

These and other aspects will now be described in detail with reference to the accompanying drawings, wherein.

DETAILED DESCRIPTION

The general structure and techniques, and more specific embodiments which can be used to effect different ways of carrying out the more general goals, are described herein.

The present application describes transfer of energy from a power source to a power destination via electromagnetic field coupling. Embodiments describe techniques for new coupling structures, e.g., transmitting and receiving antennas.

An embodiment is shown in which the main coupling occurs via inductive coupling, using primarily a magnetic field component. In the embodiment shown in FIG. 1, for example, energy is formed as a stationary magnetic wave in the area of the transmitting antenna 110. The energy that is produced is at least partly a non-radiative, stationary magnetic field. The produced field is not entirely magnetic, nor entirely stationary, however at least a portion is stationary and magnetic. Unlike a traveling electromagnetic wave, which would continue propagating into space and have its energy wasted, at least a portion of the stationary magnetic wave remains in the area of the transmitting antenna and is rendered usable by the disclosed techniques.

Other embodiments may use similar principles of the embodiments and are equally applicable to primarily electrostatic and/or electrodynamic field coupling as well. In general, an electric field can be used in place of the magnetic field, as the primary coupling mechanism.

One aspect of the embodiment is the use of a high efficiency that comes from increasing the so-called Q factor of the coupling structures (primarily the antennas) at the self-resonant frequency used for the sinusoidal waveform of the electromagnetic field, voltage or current used. The present inventors have discovered that the efficiency and amount of power is superior for a system which uses a single, substantially un-modulated sine wave. In particular, the performance is superior to a wide-band system which attempts to capture the power contained in a wideband waveform or in a plurality of distinct sinusoidal waveforms of different frequencies. Other embodiments may use less pure waveforms, in recognition of the real-world characteristics of the materials that are used. Techniques are described herein which enable small resonant antennas with relatively high Q factors.

The Q of a resonant device is the ratio of the resonant frequency to the so-called "three dB" or "half power" bandwidth of the resonant device. While there are several "definitions," all are substantially equivalent to each other, to describe Q in terms of measurements or the values of resonant circuit elements.

Figure 1:
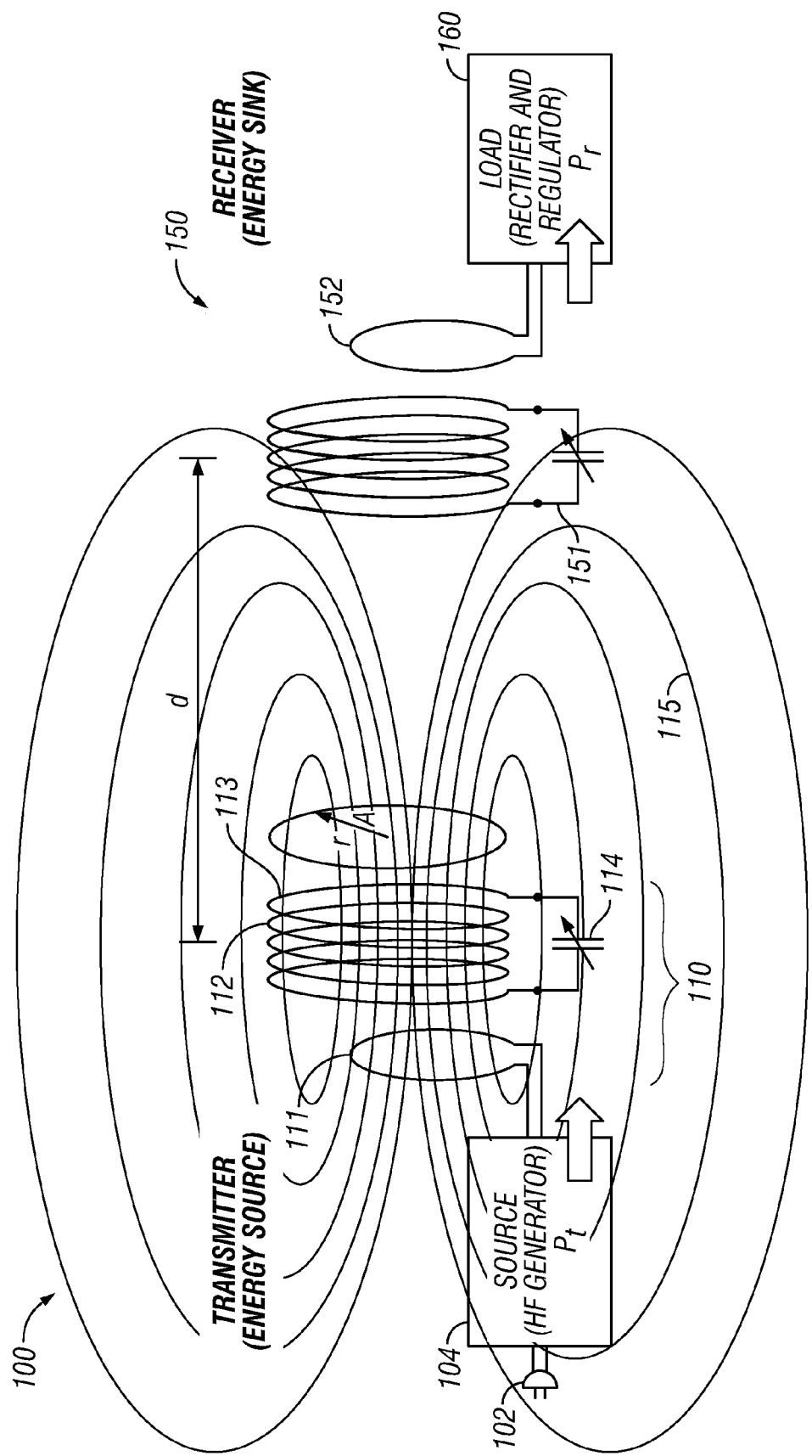
FIG. 1 shows a block diagram of a magnetic wave based wireless power transmission system.

A basic embodiment is shown in FIG. 1. A power transmitter assembly 100 receives power from a source, for example, an AC plug 102. A frequency generator 104 is used to create a signal at a frequency (Pt) and to couple that frequency to an antenna 110, here a resonant antenna. The antenna 110 includes an coupling loop 111, which is inductively and non-contactively coupled to a high Q resonant antenna part 112.

The resonant antenna includes a number N of coil loops 113 each loop having a radius $R_A$. A capacitor 114, here shown as a variable capacitor, is in series with the coil 113, forming a resonant loop. In the embodiment, the capacitor is a totally separate structure from the coil, but in certain embodiments, the self capacitance of the wire forming the coil can form the capacitance 114.

The frequency generator 104 can be preferably tuned to the antenna 110, and also selected for FCC compliance.

This embodiment uses a multidirectional antenna as the antenna part 112. 115 shows the energy as output in all directions. The antenna 100 is non-radiative, in the sense that much of the output of the antenna is not electromagnetic radiating energy, but is rather a magnetic field which is more stationary. Of course, part of the output from the antenna will in fact radiate.

Another embodiment may use a radiative antenna.

A receiver 150 includes a receiving antenna 155 placed a distance d away from the transmitting antenna 110, but not coupled thereto. The receiving antenna is similarly a high Q resonant coil antenna having a coil part and capacitor 151, coupled to an inductive coupling loop 152. The capacitor 151 may be variable for tuning. As in the transmitting antenna, the coupling loop 152 is physically separate from the main part of the antenna. The output of the coupling loop 152 is rectified in a rectifier 160, and applied to a load. That load can be any type of load, for example a resistive load such as a light bulb, or an electronic device load such as an electrical appliance, a computer, a rechargeable battery, a music player or an automobile.

The energy can be transferred through either electrical field coupling or magnetic field coupling, although magnetic field coupling is predominantly described herein as an embodiment.

Electrical field coupling provides an inductively loaded electrical dipole that is an open capacitor or dielectric disk. Extraneous objects may provide a relatively strong influence on electric field coupling. Magnetic field coupling may be preferred, since it extraneous objects have the same magnetic properties as "empty" space.

The embodiment describes a magnetic field coupling using a capacitively loaded magnetic dipole. Such a dipole is formed of a wire loop forming at least one loop or turn of a coil, in series with a capacitor that electrically loads the antenna into a resonant state.

Figure 2:
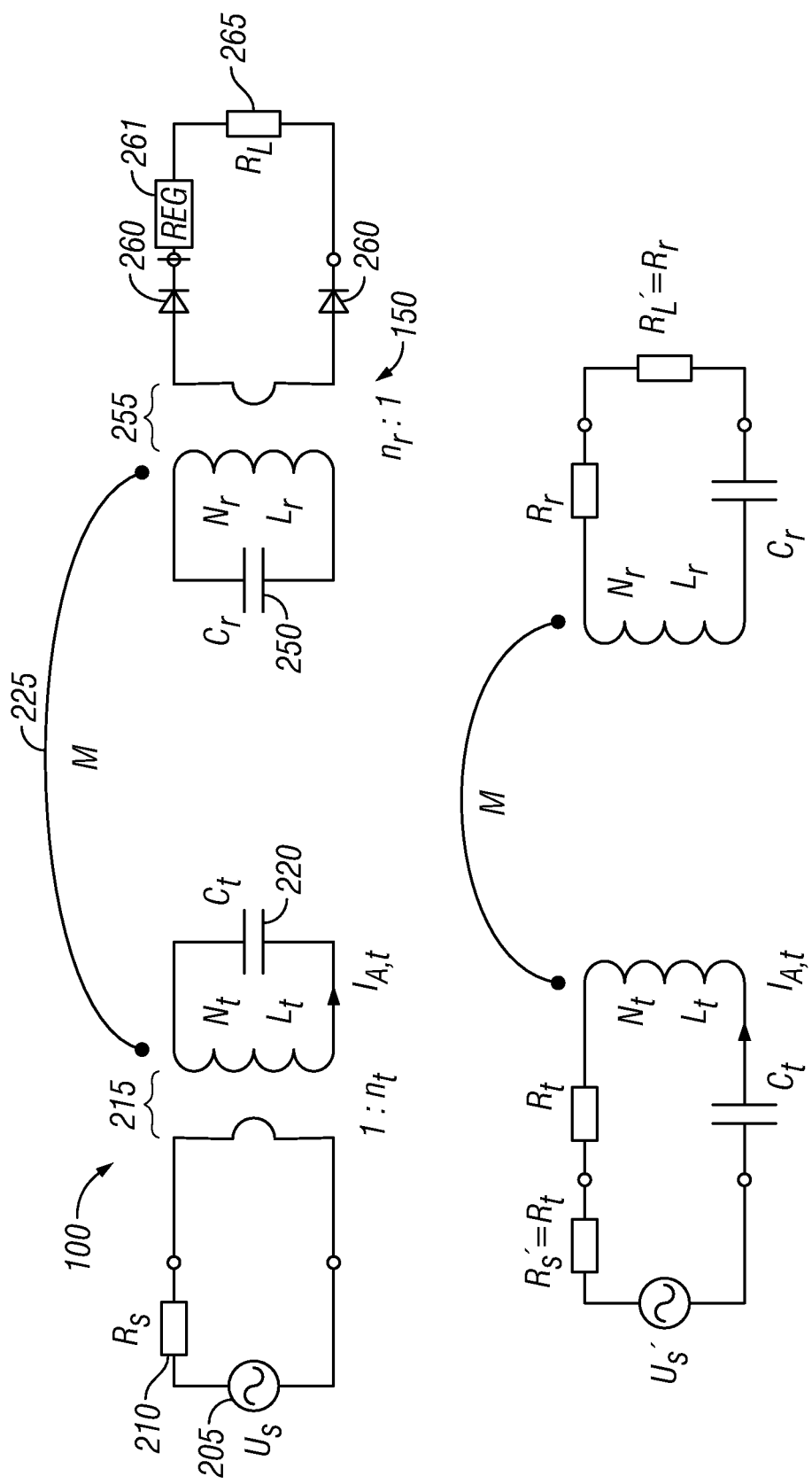
FIG. 2 illustrates circuit diagrams of the circuits in the FIG. 1 diagram.
Figure 3:
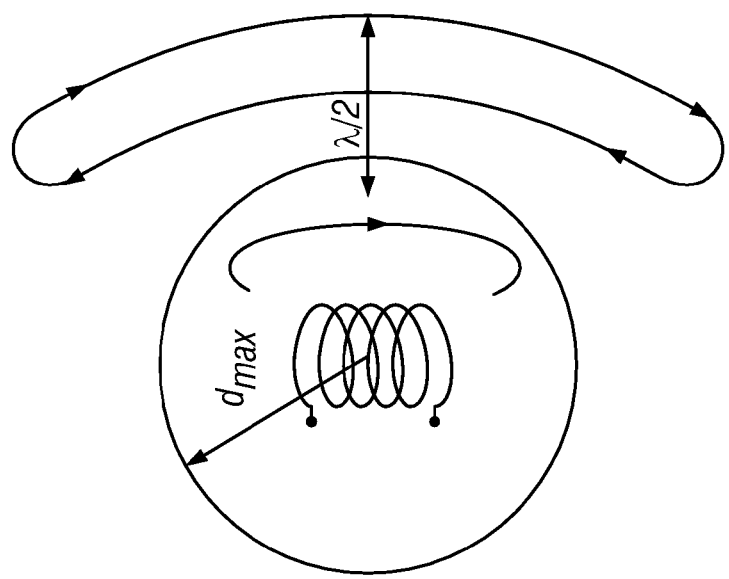
FIG. 3 illustrates an exemplary near field condition plot.
Figure 3:
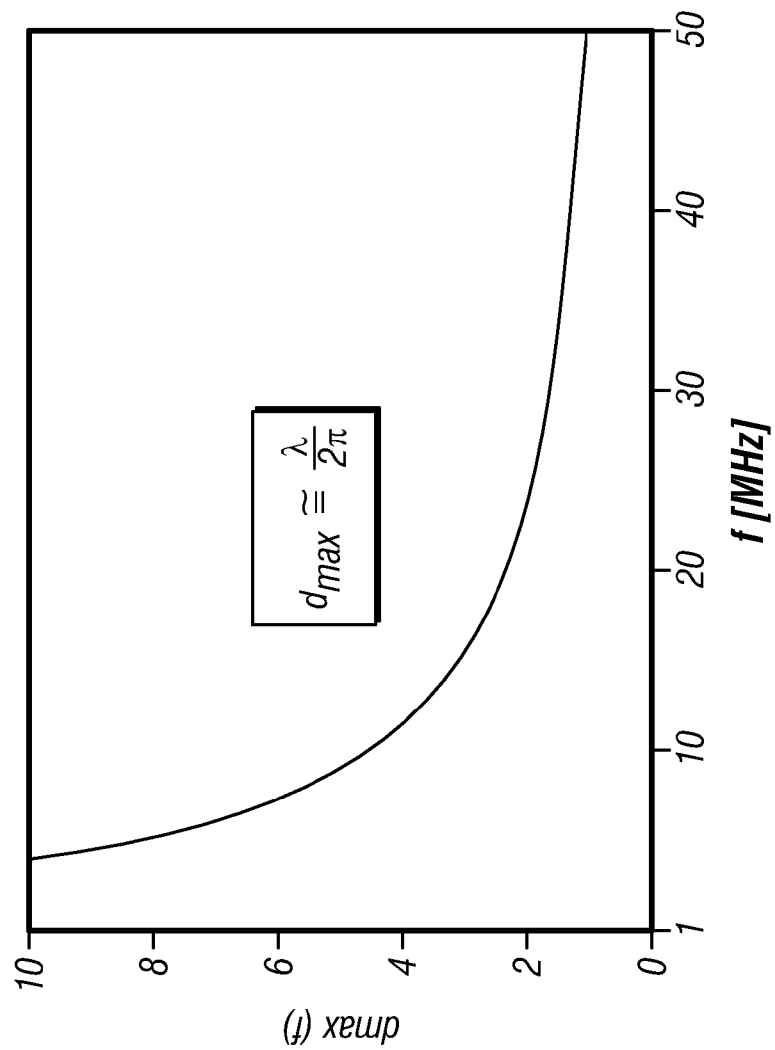

FIG. 2 shows an equivalent circuit for the energy transfer. The transmit circuit 100 is a series resonant circuit with RLC portions that resonate at the frequency of the high frequency generator 205. The transmitter includes a series resistance 210, and inductive coil 215, and a variable capacitance 220. This produces the magnetic field M which is shown as magnetic lines of force 225.

The signal generator 205 has an internal resistance that is preferably matched to the transmit resonator's resistance at resonance by the inductive loop. This allows transferring maximum power from the transmitter to the receiver antenna.

The receive portion 150 correspondingly includes a capacitor 250, transformer coil 255, rectifier 260, and regulator 261, to provide a regulated output voltage. The output is connected to a load resistance 265. FIG. 2 shows a half wave rectifier, but it should be understood that more complex rectifier circuits can be used. The impedance of the rectifier 260 and regulator 261 is matched to the resistance of the receive resonator at resonance. This enables transferring a maximum amount of power to the load. The resistances take into account skin effect/proximity effect, radiation resistance, as well as both internal and external dielectric loss.

A perfect resonant transmitter will ignore, or minimally react with, all other nearby resonant objects having a different resonant frequency. However, when a receiver that has the proper resonant frequency encounters the field of the transmitting antenna 225, the two couple in order to establish a strong energy link. In effect, the transmitter and receiver operate to become a loosely coupled transformer.

The inventors have discovered a number of factors that improve the transfer of power from transmitter to receiver.

Q factor of the circuits, described above, can assist with certain efficiencies. A high Q factor allows increased values of current at the resonant frequency. This enables maintaining the transmission over a relatively low wattage. In an embodiment, the transmitter Q may be 1400, while the receiver Q is around 300. For reasons set forth herein, in one embodiment, the receiver Q may be much lower than the transmitter Q, for example ¼ to ⅕ the transmitter Q. However, other Q factors may be used.

High Q has a corresponding disadvantage of narrow bandwidth effects. Such narrow bandwidth have typically been considered as undesirable for data communications. However, the narrow bandwidth can be used in power transfer. When a high Q is used, the transmitter signal is sufficiently pure and free of undesired frequency or phase modulation to allow transmission of most of its power over this narrow bandwidth.

For example, an embodiment may use a resonant frequency of 13.56 MHz and a bandwidth of around 9 kHz. This is highly usable for a substantially un-modulated fundamental frequency. Some modulation on the fundamental frequency may be tolerated or tolerable, however, especially if other factors are used to increase the efficiency. Other embodiments use lower Q components, and may allow correspondingly more modulation on the fundamental.

An important feature may include use of a frequency which is permitted by regulation, such as FCC regulations. The preferred frequency in this exemplary embodiment is 13.56 MHz but other frequencies may be used as well.

In addition, the capacitors should be able to withstand high voltages, for example as high as 4 kV, since the resistance may be small in relation to the capacitive reactance. A final important feature is the packaging: the system should be in a small form factor.

One aspect of improving the coupling between the transmit and receive antenna is to increase the Q of the antenna. The efficiency of power transfer $\eta$ may be expressed as $$\eta(d) \cong \frac{r_{A,t}^3 \cdot r_{A,r}^3 \cdot Q_t \cdot Q_r}{16 d^6}.$$

Note that this increases as the cube of the radius of the transmitting antenna, the cube of the radius of the receiving antenna, and decreases to the sixth power of the distance. The radii of the transmit and receive antennas may be constrained by the application in which they are used. Accordingly, increasing the Q in some applications may be a preferred way of increasing the efficiency.

Figure 4:
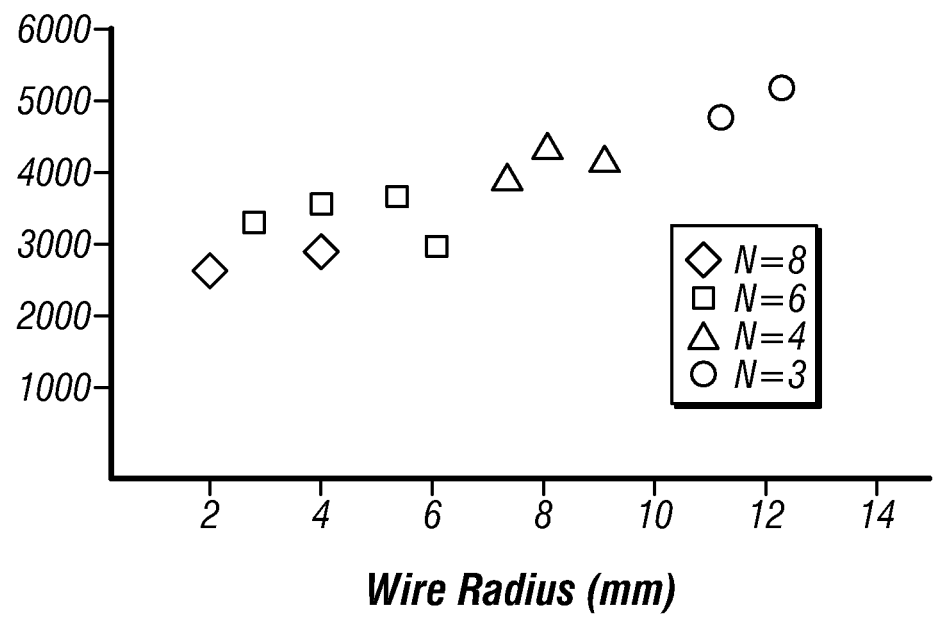
FIG. 4 illustrates a graph between Q factors that were experimentally found between different antennas.

FIG. 4 illustrates a graph between Q factors that were experimentally found between different antennas. This graph shows that, for a given frequency, the Q factors increases when the resonator coil of the resonator has fewer turns.

The inventors discovered an optimum antenna that may exist with a single turn loop, provided that the loss resistance of the material, e.g., the wire or tubing, forming the loop is maintained sufficiently low.

Figure 5:
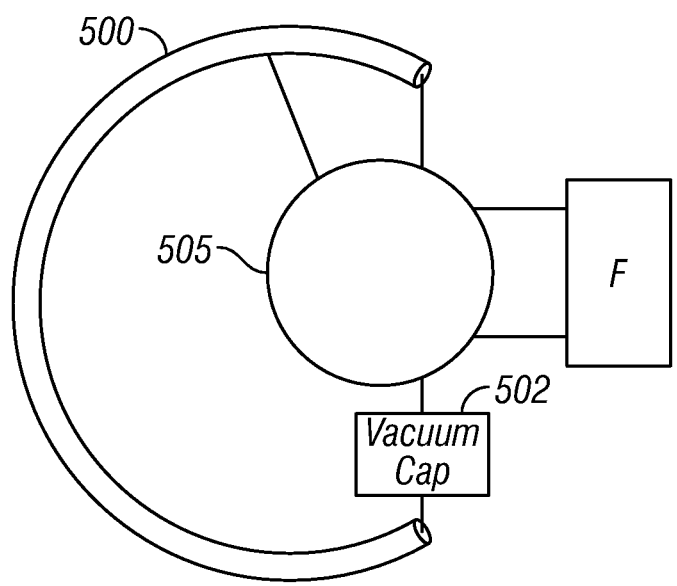
FIG. 5 illustrates a large one turn antenna.

An embodiment illustrated in FIG. 5 uses a single turn antenna 500 formed of a relatively thick conductor material, driven by a smaller coil 505. The antenna 500 is provided in series with a capacitive loading, here a vacuum capacitor 502. In an embodiment, the single turn antenna is formed of copper tubing. The vacuum capacitors which have a very high Q factor and can also handle a very high voltage. Vacuum capacitors on the order of 200 pf can be used, for example. This antenna may have a low impedance, thereby enabling high current and high magnetic field. It may also provide low RF voltage and thus low electric stray field and lower susceptibility to loss from extraneous objects.

An embodiment may use a 6 mm copper tube coil resonator and a loop radius of 9 inches. Another embodiment may use a 30 mm copper tube. Preferably the copper tube is at least 1 inch in diameter, used with a vacuum capacitor that has a very high Q. A vacuum capacitor may have a Q of 1000.

An issue with the single turn loop antenna is that it must have a relatively large diameter.

Figure 6:
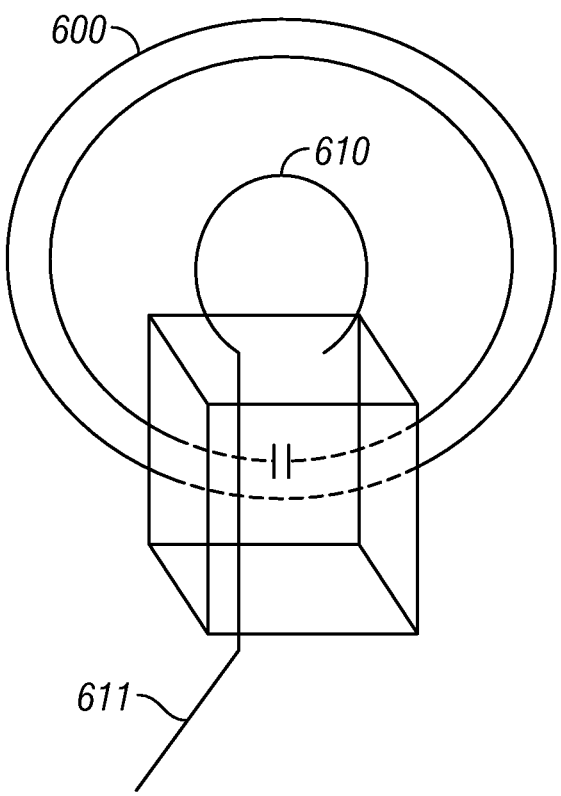
FIG. 6 illustrates a cube-shaped two turn antenna.

A compromise size may be formed from a two-turn antenna, which is shown in FIG. 6. The two-turn antenna can have a 3 ½ inch diameter coil 600. FIG. 6 illustrates a plastic housing, using a vacuum capacitor integrated directly on the antenna. The transmission inducement coil 610 is also mounted on the housing, connected to a cable 611.

Figure 7:
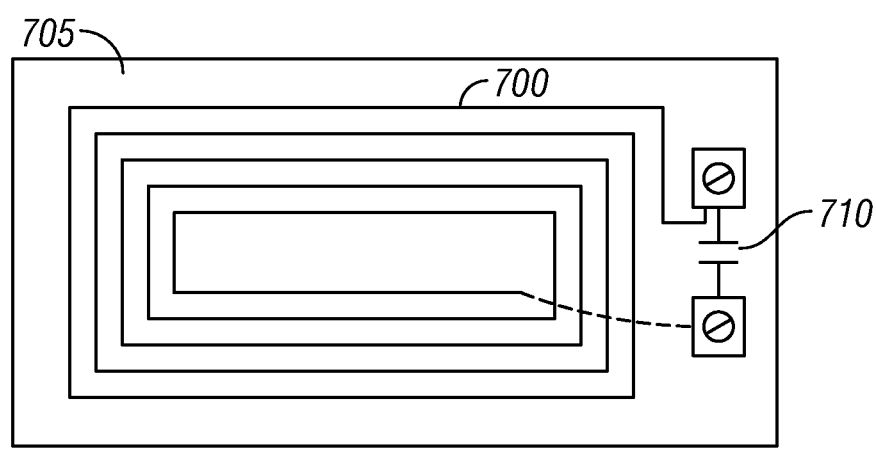
FIG. 7 illustrates a very small receiver antenna.

The receiver antennas can also be important. FIG. 7 illustrates an exemplary receiver antenna including a plurality of turns of material 700 mounted on a substrate 705. A capacitor 710 is attached to the coil material 700.

It was found that the substrate that is used as a base may itself be important in setting the Q. Table 1 illustrates some exemplary electrical properties (including Quality factor) for different substrates

TABLE 1

Electric properties of different substrate materials

| Material | Loss factor (tan δ) | Quality Factor (1/tan δ) | Dielectric constant $\epsilon_r$ |
|---|---|---|---|
| FR4 | 0.0222 | 45 | 3.95 |
| PVC | 0.0063 | 160 | 1.10 |
| Rubalit 710 | 0.0013 | 770 | 1.00 |
| PTFE (Teflon) | 0.0011 | 910 | 1.20 |

This data is valid for frequencies in the range from 10-20 MHz only

Table 1: Electrical Properties of Different Substrate Materials

The FIG. 7 antenna is a six turn antenna, and has a quality factor of around 400. According to an embodiment, a high quality factor material, such as PTFE, is used as the substrate. Another aspect is the limits which can be used on these antennas. Table 2 illustrates the likely limits for the application.

| FCC LIMITS FOR MAXIMUM PERMISSABLE EXPOSURE (MPE) | | | | |
|---|---|---|---|---|
| Frequency Range (MHz) | Electric Field Strength (E) (V/m) | Magnetic Field Strength (H) (A/m) | Power Density (S) (mW/cm$^2$) | Averaging Time $\|E\|^3$, $\|H\|^2$ or S (minutes) |
| (A) Limits for Occupational/Controlled Exposure | | | | |
| 0.3-3.0 | 614 | 1.63 | (100)* | 6 |
| 3.0-30 | 1842/f | 4.89/f | (900/f)* | 6 |
| 30-300 | 61.4 | 0.163 | 1.0 | 6 |
| 300-1500 | — | — | f/300 | 6 |
| 1500-100,000 | — | — | 5 | 6 |
| (B) Limits for General Population/Uncontrolled Exposure | | | | |
| 0.3-1.34 | 614 | 1.63 | (100)* | 30 |
| 1.34-30 | 824/f | 2.19/f | (180/f)* | 30 |
| 30-300 | 27.5 | 0.073 | 0.2 | 30 |
| 300-1500 | — | — | f/1500 | 30 |
| 1500-100,000 | — | — | 1.0 | 30 | f = frequency in MHz
*Plane-wave equivalent power density
NOTE 1:
See Section 1 for discussion of exposure categories.
NOTE 2:
The averaging time for General Population/Uncontrolled exposure to fixed transmitters is not applicable for mobile and portable transmitters. See 47 CFR §§2.1891 and 2.2863 on source-based time-averaging requirements for mobile and portable transmitters.

Figure 8:
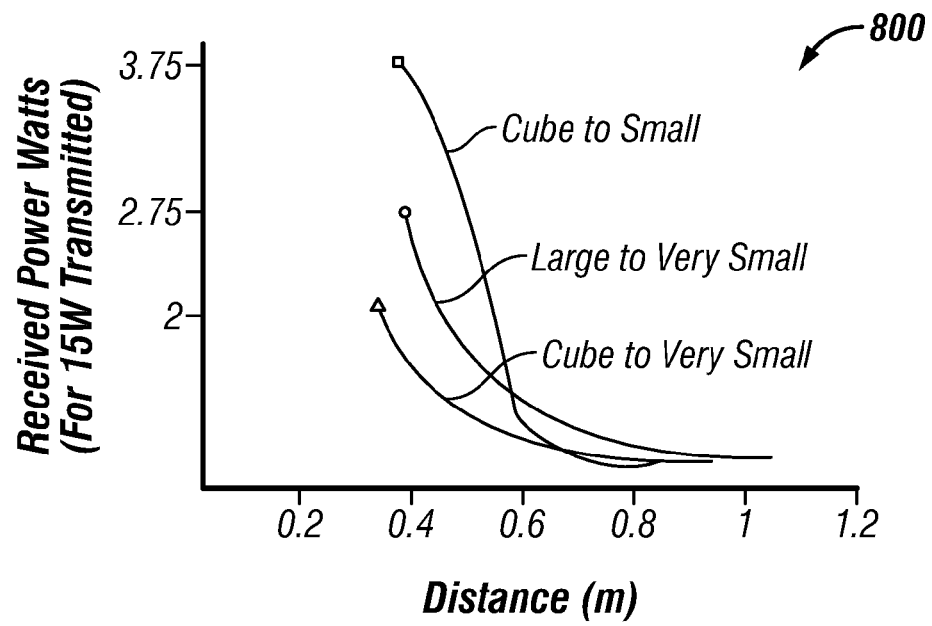
FIG. 8 illustrates some exemplary power transfer operations.

Some exemplary power transfer operations are illustrated in FIG. 8. The receiver antenna can be small or "very small". The transmitting antenna can be the type "large", shown in FIG. 5, or the "cube" type shown in FIG. 6. FIG. 8 illustrates the power for a transmit power of 15 W. The horizontal line 800 in FIG. 8 illustrates ½ watt being received for a 15 watt transmission. Anything above this amount may be considered acceptable.

Figure 9:
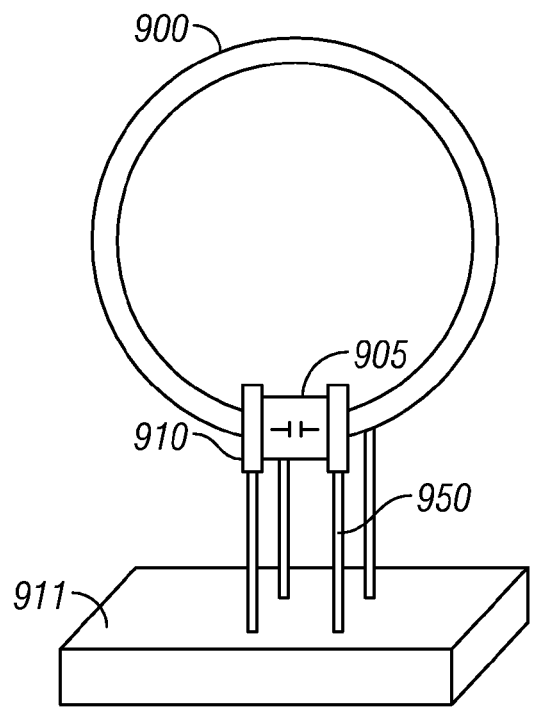
FIG. 9 illustrates a large transmit antenna with a capacitor holder including plural different standoffs.

FIG. 9 illustrates the large transmit antenna, using 30 mm tubing 900, and a vacuum capacitor 905 integrated in between the portions of the antenna. The capacitor 905 is mounted within a capacitor holder structure 910 which is welded or soldered between ends of the loop. A capacitor holder includes plural different standoffs 950, within which, or attached to which, the capacitors can be located. The substrate 911 in FIG. 9 may be a high-q material, as described above.

Although only a few embodiments have been disclosed in detail above, other embodiments are possible and the inventors intend these to be encompassed within this specification. The specification describes specific examples to accomplish~more general goal that may be accomplished in another way. This disclosure is intended to be exemplary, and the claims are intended to cover any modification or alternative which might be predictable to a person having ordinary skill in the art. For example, other sizes, materials and connections can be used. Although the coupling part of the antenna is shown as a single loop of wire, it should be understood that this coupling part can have multiple wire loops.

Also, the inventors intend that only those claims which use the-words "means for" are intended to be interpreted under 35 USC 112, sixth paragraph. Moreover, no limitations from the specification are intended to be read into any claims, unless those limitations are expressly included in the claims.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A transmitter system for transmitting electrical power via a wireless field, comprising:

a source configured to produce an output electrical signal having a first frequency;

a non-resonant coupling part, physically connected to said source, said coupling part including a first loop of wire; and a resonant antenna part, spaced from said coupling part such that said antenna part is galvanically isolated from said coupling part and is magnetically coupled to said coupling part, said antenna part configured to receive power wirelessly from said coupling part, and said antenna part configured to produce an electromagnetic field based on said power that is wirelessly received, said antenna part comprising a capacitor integrated thereon, and said antenna part configured to resonate at said first frequency.

2. The system as in claim 1, wherein said antenna part has a quality factor greater than 500.

3. The system as in claim 2, wherein said antenna part is formed with an integral capacitor made from a vacuum capacitor.

4. A system as in claim 1, wherein said antenna part is located on a substrate that supports said antenna part, and said substrate has a quality factor which is greater than 500.

5. The transmitter system as in claim 4, wherein said antenna is located on a substrate of PTFE.

6. The transmitter system as in claim 4, wherein said antenna is located on a substrate of PVC.

7. The transmitter system as in claim 4, wherein said antenna is located on a substrate of Rubalit 710.

8. The transmitter system as in claim 4, wherein said antenna is located on a substrate of FR4.

9. The system as in claim 1, wherein said antenna part has an inductive coil loop, said capacitor connected across a portion of said inductive coil loop.

10. The system as in claim 9, further comprising a cube shaped housing in which said capacitor is housed.

11. The system as in claim 9, wherein said antenna has two turns in the coil loop.

12. The system as in claim 1, wherein said antenna part has a single turn in the coil loop.

13. The system as in claim 1, wherein said antenna part has a quality factor that is a ratio of a resonant frequency of the antenna part to a half power bandwidth of the antenna part.

14. The system as in claim 1, wherein said capacitor has a Q of at least 1000.

15. The system as in claim 1, further comprising an attachment part extending between distal edges of material which defines a loop, said attachment part including a vacuum capacitor.

16. The transmitter system as in claim 1, wherein said first frequency is 13.56 MHz.

17. The system as in claim 1, wherein the antenna part has an antenna resistance, and wherein the antenna resistance is equal to a value based on the internal resistance of the signal generator to maximize power transferred from the transmitter to a receiver.

18. The system as in claim 17, wherein the antenna resistance is matched to the resistance of the signal generator.

19. A system for transmitting electrical power via a wireless field, comprising:
a source configured to produce an output electrical signal having a first frequency;
an antenna part configured to create an electromagnetic field based on said power that is wirelessly received, said antenna part comprising a capacitor integrated thereon, said antenna part being substantially resonant at said first frequency; and
a receiver configured to receive the electrical power, where the receiver includes:
a resonant antenna that is tuned to said first frequency; and
a non-resonant coupling part, spaced from said antenna, such that said coupling part is galvanically isolated from said antenna and is magnetically coupled to said antenna, said coupling part configured to receive a signal having said first frequency from said antenna, and said coupling part configured to produce a power output based on the received signal.

20. The system as in claim 19, wherein the receiver has a quality factor value that is lower than a quality factor value of the antenna part.

21. The system as in claim 19, wherein the receiver has a quality factor that is equal to or less than one quarter of the quality factor of the antenna part.

22. The system as in claim 19, wherein the receiver antenna has footprint that is smaller than a footprint of the antenna part.

23. The system as in claim 19, wherein the antenna part and receiver antenna are configured to be coupled with one another to form an energy link that is operative like a loosely coupled transformer.

24. A receiver system for receiving electrical power via an electromagnetic field, comprising:
a resonant antenna part, configured to receive power via the electromagnetic field, said antenna part comprising a capacitor integrated thereon, the antenna part being substantially resonant at a first frequency; and
a non-resonant coupling part, spaced from said antenna part, such that said coupling loop is galvanically isolated from said antenna part and is magnetically coupled to said antenna part, said coupling part configured to receive a signal having said first frequency from said antenna part, and said coupling part configured to produce a power output based on the received signal.

25. The system as in claim 24, further comprising an electrical circuit configured to receive said power output and said electrical circuit further configured to produce output power based on the received power output.

26. The system as in claim 25, wherein said antenna part has a quality factor greater than 500.

27. The system as in claim 25, wherein said antenna part is located on a substrate that supports said antenna part, and said substrate has a quality factor which is greater than 500.

28. The system as in claim 26, wherein said antenna part comprises an integral capacitor made from a vacuum capacitor.

29. The system as in claim 26, wherein said antenna part comprises an inductive coil loop, and a capacitor connected across a portion of said inductive coil loop.

30. The system as in claim 29, further comprising a cube shaped housing in which said capacitor is housed.

31. The system as in claim 29, wherein said antenna part has a single turn in the coil loop.

32. The system as in claim 29, wherein said antenna has two turns in the coil loop.

33. The system as in claim 26, further comprising a transmitter for the electrical power, where the transmitter includes an antenna that is tuned to said specified frequency.

34. The system as in claim 33, wherein the antenna part has a quality factor value that is lower than a quality factor value of the transmitter.

35. The system as in claim 33, wherein the transmitter has a quality factor that is equal to or less than one quarter of the quality factor of the transmitter.

36. The system as in claim 33, wherein the antenna part has a footprint that is smaller than a footprint of the transmitter antenna.

37. The system as in claim 33, wherein the transmitter antenna and receiver antenna part are configured to be coupled with one another to form an energy link that operates as a loosely coupled transformer.

38. The system as in claim 33, wherein said quality factor is a ratio of a resonant frequency of the antenna part to a half power bandwidth of the antenna part.

39. The system as in claim 33, wherein said capacitor has a Q of at least 1000.

40. The system as in claim 33, wherein said capacitor is a vacuum capacitor.

41. The receiver as in claim 24, wherein said first frequency is 13.56 Mhz.

42. The receiver as in claim 24, wherein said antenna is located on a substrate of PTFE.

43. The receiver as in claim 24, wherein said antenna is located on a substrate of PVC.

44. The receiver as in claim 24, wherein said antenna is located on a substrate of Rubalit 710.

45. The receiver as in claim 24, wherein said antenna is located on a substrate of FR4.

46. The system as in claim 24, wherein the coupling loop is connected to a load and is configured to transfer power to the load, wherein the antenna part has an antenna resistance, and wherein the antenna resistance is equal to a value based on the resistance of the load to maximize power transferred to the load.

47. The system as in claim 46, wherein the antenna resistance is matched to the resistance of the load.

48. A method, comprising:
producing a magnetic field at a first frequency based on applied power using a non-resonant loop antenna; and
coupling a portion of the power, via a wireless field, between said non-resonant loop antenna and a resonant loop antenna that is gavanically isolated from said non-resonant loop antenna and magnetically coupled to the non-resonant loop antenna, where said resonant loop antenna comprises a capacitor integrated thereon, and where said resonant loop antenna has a resonant value at said first frequency.

49. The method as in claim 48, wherein said non-resonant and resonant loop antennas are both transmit antennas.

50. The method as in claim 48, wherein said coupling comprises coupling using a loosely-coupled transformer coupling.

51. The method as in claim 48, wherein the first loop antenna has an antenna resistance, and wherein the antenna resistance is equal to a value based on the internal resistance of a signal generator to maximize power transferred from a transmitter to a receiver.

52. The method as in claim 51, wherein the antenna resistance is matched to the resistance of the signal generator.

53. A method, comprising:
receiving power via an electromagnetic field at a first frequency based on applied power using a resonant loop antenna comprising a capacitor integrated thereon, from a non-resonant loop antenna that is associated with said resonant loop antenna, and where said resonant loop antenna and said non-resonant loop antenna are galvanically isolated from one another, and where said non-resonant loop antenna has no separate capacitor attached thereto, and where said non-resonant loop antenna is configured to receive a signal having said first frequency from said resonant loop antenna; and
transmitting a portion of the power received via the electromagnetic field between said resonant loop antenna and said non-resonant loop antenna; and
rectifying an output from said non-resonant loop antenna to produce a DC output.

54. The method as in claim 53, wherein said first and second loop antennas are both receive antennas.

55. The method as in claim 53, wherein said coupling comprises coupling using a loosely-coupled transformer coupling.

56. The method as in claim 53, further comprising transferring power to a load with the second loop antenna, wherein the second loop antenna has an antenna resistance, and wherein the antenna resistance is equal to a value based on the resistance of the load to maximize power transferred to the load.

57. The method as in claim 56, wherein the antenna resistance is matched to the resistance of the load.

58. A transmitter system for transmitting electrical power via a wireless field, comprising:
a source configured to produce an output electrical signal having a first frequency;
a non-resonant coupling part, physically connected to said source, said coupling part comprising multiple loops of wire; and
a resonant antenna part, spaced from said coupling part such that said antenna part is galvanically isolated from said coupling part and is magnetically coupled to said coupling part, said antenna part receiving power wirelessly from said coupling part, and said antenna part producing an electromagnetic field based on said power that is wirelessly received, said antenna part comprising a capacitor integrated thereon, and said antenna part configured to resonate at said first frequency.

59. The transmitter system as in claim 58, wherein said multiple loops of wire are impedance matched to the source.

60. The system as in claim 58, wherein said antenna part has a quality factor greater than 500.

61. The system as in claim 58, wherein said antenna part is formed with an integral capacitor comprising a vacuum capacitor.

62. The system as in claim 58, wherein said antenna part comprises an inductive coil loop and a capacitor connected across a portion of said inductive coil loop.

63. The system as in claim 62, wherein said antenna part comprises a single turn in the inductive coil loop.

64. The system as in claim 62, wherein said antenna comprises two turns in the inductive coil loop.

65. The system as in claim 58, further comprising a receiver for the electrical power, where the receiver includes an antenna that is tuned to said first frequency.

66. The system as in claim 65, wherein the receiver has a quality factor value that is lower than a quality factor value of the antenna part.

67. The system as in claim 65, wherein the receiver has a quality factor that is equal to or less than one quarter of the quality factor of the antenna part.

68. The system as in claim 65, wherein the receiver antenna has a footprint that is smaller than a footprint of the antenna part.

69. The system as in claim 65, wherein the transmitter antenna and receiver antenna coupled to one another in order to form energy link that is operative like a loosely coupled transformer.

70. The system as in claim 58, wherein the antenna part has an antenna resistance, and wherein the antenna resistance is equal to a value based on the internal resistance of the signal generator to maximize power transferred from the transmitter to a receiver.

71. The system as in claim 70, wherein the antenna resistance is matched to the resistance of the signal generator.

72. A receiver system for receiving electrical power via an electromagnetic field, comprising:
a resonant antenna part, configured to receive power via the electromagnetic field, said antenna part comprising a capacitor integrated thereon and configured to be substantially resonant with a first frequency; and
a non-resonant coupling part, spaced from said antenna part, such that said coupling part is galvanically isolated from said antenna part and is magnetically coupled to said antenna part, said coupling part formed of multiple turns of wire, and said coupling part configured to receive a signal having said first frequency from said antenna part, and producing a power output based on the received signal.

73. The system as in claim 72, further comprising an electrical circuit configured to receive said power output, said electrical circuit further configured to produce output power based on the received power output.

74. The system as in claim 72, wherein said antenna part has a quality factor greater than 500.

75. The system as in claim 72, wherein said antenna part is formed on a substrate that supports said antenna part, and said substrate has a quality factor which is greater than 500.

76. The system as in claim 72, wherein said antenna part comprises a coil loop having a single turn.

77. The system as in claim 72, wherein said antenna comprises a coil loop having a two turns.

78. The system as in claim 72, further comprising a transmitter configured to transmit the electrical power, where the transmitter includes an antenna that is tuned to said first frequency.

79. The system as in claim 78, wherein the antenna part has a quality factor value that is lower than a quality factor value of the transmitter.

80. The system as in claim 78, wherein the antenna part has a quality factor that is equal to or less than one quarter of the quality factor of the transmitter.

81. The system as in claim 78, wherein the antenna part has a footprint that is smaller than a footprint of the transmitter antenna.

82. A system as in claim 72, wherein the coupling part is connected to a load and is configured to transfer power to the load, wherein the antenna part has an antenna resistance, and wherein the antenna resistance is equal to a value based on the resistance of the load to maximize power transferred to the load.

83. The system as in claim 82, wherein the antenna resistance is matched to the resistance of the load.

84. A method, comprising:
producing a magnetic field at a first frequency based on applied power using a non-resonant loop antenna formed of multiple loops of wire, the non-resonant loop antenna including no separate capacitor attached thereto; and
coupling a portion of the power, via a wireless field, between said non-resonant loop antenna and a resonant loop antenna associated with the non-resonant loop antenna, where said resonant loop antenna comprising a capacitor integrated thereon, and where said resonant loop antenna has a resonant value at said first frequency.

85. A wireless electrical power system, comprising:
a transmitter, comprising:
a source configured to produce an output electrical signal having a first frequency,
a non-resonant coupling part, physically connected to said source, said coupling part comprising a first loop of wire, and
a non-resonant antenna part spaced from said coupling part such that said antenna part is galvanically isolated from said coupling part and is magnetically coupled to said coupling part, said antenna part wirelessly receiving power from said coupling part and said antenna part producing an electromagnetic field based on said power that is wirelessly received, said antenna part comprising a capacitor integrated thereon, and said antenna part having an LC value which is substantially resonant with said first frequency; and
a receiver configured to receive the electrical power, where the receiver includes an antenna that is tuned to said first frequency,
wherein the receiver has a quality factor value that is lower than a quality factor value of the transmitter.

86. The system as in claim 85, wherein said coupling part comprises multiple turns.

87. The system as in claim 85, wherein said antenna part comprises a coil loop having a single turn.

88. The system as in claim 85, wherein said antenna part comprises a coil loop having two turns.

89. The system as in claim 85, wherein the receiver has a quality factor that is equal to or less than one quarter of the quality factor of the transmitter.

90. The system as in claim 85, wherein the receiver antenna has a footprint that is smaller than a footprint of the transmitter antenna.

91. A system for transmitting power, comprising:
a source configured to produce an output electrical signal having a first frequency;
a resonant antenna part configured to produce an electromagnetic field for transferring power to a receiver, the antenna part having a capacitor integrated thereon, the antenna part configured to resonate at said first frequency; and
non-resonant means for receiving the output electrical signal from the source and transferring power to the antenna part, via an electromagnetic field, the means for receiving the output electrical signal being physically connected to the source and magnetically coupled to the antenna part.

92. The system as in claim 91, wherein the means for receiving the output electrical signal comprises a coupling loop.

93. A system for receiving power comprising:
a resonant antenna part configured to receive power, via an electromagnetic field, at a first frequency, the antenna part configured to resonate at said first frequency;
non-resonant means for receiving power, via an electromagnetic field at said first frequency, from the antenna part, the means for receiving power configured to be magnetically coupled with the antenna part; and
means for rectifying an output received from the means for receiving power to produce a DC output.

* * * * *